US008807895B2

(12) United States Patent
Brown

(10) Patent No.: US 8,807,895 B2
(45) Date of Patent: Aug. 19, 2014

(54) FASTENER HOUSING FOR SECURING A BUMPER FASCIA TO A FENDER PANEL OF AN AUTOMOTIVE VEHICLE

(75) Inventor: Bernard Patrick Brown, Farmington, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 103 days.

(21) Appl. No.: 13/181,951

(22) Filed: Jul. 13, 2011

(65) Prior Publication Data

US 2013/0017033 A1  Jan. 17, 2013

(51) Int. Cl.
*F16B 39/284* (2006.01)
*F16B 39/28* (2006.01)
*F16B 37/04* (2006.01)
*F16B 43/02* (2006.01)
*B60R 19/24* (2006.01)

(52) U.S. Cl.
CPC ............... *F16B 37/043* (2013.01); *F16B 43/02* (2013.01); *B60R 19/24* (2013.01); *B60R 2019/247* (2013.01)
USPC .......... 411/112; 411/508; 24/297; 24/581.11; 24/289

(58) Field of Classification Search
CPC ...... F16B 37/044; F16B 37/043; F16B 43/02; F16B 21/086; B60R 19/24; B60R 2019/247
USPC ......... 411/111, 112, 113, 103, 182, 538, 174, 411/175, 133, 508, 913; 24/289, 292, 297, 24/581.11
See application file for complete search history.

(56) References Cited

U.S. PATENT DOCUMENTS

| | | | | |
|---|---|---|---|---|
| 22,618 A | * | 1/1859 | Johnson | 42/69.01 |
| 3,141,489 A | * | 7/1964 | Rapata | 411/182 |
| 3,495,643 A | * | 2/1970 | Dey et al. | 411/113 |
| 4,293,260 A | * | 10/1981 | Kojima et al. | 411/44 |
| 4,354,566 A | | 10/1982 | Yuda | |
| 4,597,153 A | | 7/1986 | Zaydel | |
| 4,726,722 A | * | 2/1988 | Wollar | 411/32 |
| 4,906,152 A | * | 3/1990 | Kurihara | 411/182 |
| 5,029,920 A | * | 7/1991 | Furuta et al. | 293/154 |
| 5,139,306 A | | 8/1992 | Ott et al. | |
| 5,226,695 A | | 7/1993 | Flint et al. | |
| 5,289,621 A | * | 3/1994 | Kaneko | 24/453 |
| 5,536,125 A | * | 7/1996 | Gaw, Jr. | 411/182 |
| 5,692,953 A | * | 12/1997 | Bell et al. | 454/146 |
| 5,779,411 A | * | 7/1998 | Vasseur et al. | 411/55 |
| 5,906,466 A | * | 5/1999 | Eandi | 411/538 |
| 6,059,502 A | * | 5/2000 | Konig et al. | 411/182 |
| 6,233,792 B1 | | 5/2001 | Kanie | |

(Continued)

*Primary Examiner* — Robert J Sandy
*Assistant Examiner* — Caroline L Natirboff
(74) *Attorney, Agent, or Firm* — Gifford, Krass, Sprinkle, Anderson & Citkowski, P.C.

(57) ABSTRACT

A fastener housing for securing a bumper fascia to a fender panel includes a shank portion, a skirt portion, and an arm portion. The shank portion includes a first end and an opposite second end and a throughbore extending from the first end to the second end. The shank portion has a widened cross sectional shape which avoids rotation upon insertion into the connection portion of the bumper fascia or fender panel. The skirt portion extends radially from the first end of the shank portion. The arm portion includes a proximate end connected to the skirt portion and a distal end having a protrusion extending generally normal from the arm portion.

13 Claims, 5 Drawing Sheets

(56) References Cited

U.S. PATENT DOCUMENTS

| | | |
|---|---|---|
| 6,553,615 B1 * | 4/2003 | Hansen et al. .................. 16/2.1 |
| 7,210,886 B2 * | 5/2007 | Kawai et al. .................. 411/508 |
| 7,488,032 B2 | 2/2009 | Thakar et al. |
| 7,523,959 B2 * | 4/2009 | Kawai et al. ............... 280/730.2 |
| 7,540,550 B1 | 6/2009 | Huber et al. |
| D604,678 S | 11/2009 | Walter et al. |
| 2010/0111638 A1 * | 5/2010 | Rueckel ........................ 411/173 |

* cited by examiner

FASTENER HOUSING FOR SECURING A BUMPER FASCIA TO A FENDER PANEL OF AN AUTOMOTIVE VEHICLE

FIELD OF THE INVENTION

The present invention relates to a fastener housing for securing a first component to a second component. More particularly, the invention relates to a fastener housing for securing a bumper fascia to a fender panel of an automotive vehicle.

BACKGROUND OF THE INVENTION

Most modern automotive vehicles include a bumper fascia which extends the width of either the front or rear portion of an automotive vehicle. Although the bumper fascia is attached to the structural component or frame of the automotive vehicle at several locations, it is also required that the ends of the bumper fascia, which form a portion of the automotive vehicle wheel well, be secured to a fender panel which forms the remainder portion of the wheel well. Due to the narrow size of the ends of the bumper fascia adjacent the wheel well, a threaded fastener is typically used to secure the bumper fascia to the fender panel. The connection of the end portion of the bumper fascia and the fender panel is required to provide the proper placement of the components which provides an aesthetically pleasing appearance thereby increasing customer satisfaction with the automotive vehicle.

Modern automotive vehicles typically include a character line in which a portion of both the bumper fascia and the fender panel flare outwardly in a curved manner adjacent the wheel well. In order to provide the connecting portions for the fastener in the bumper fascia and fender panel, the character line includes a softened or curved portion defining the bumper fascia and fender panel from the flared portion. However, it is desirable to provide an aesthetically pleasing appearance of the automotive vehicle in which the flared portion is defined by a hard or rigid character line without the use of the curved portion defining the flared portion adjacent the wheel well.

Due to the positions of both the bumper fascia and the fender panel, it is required that the fastener be inserted from a blind position. Specifically, the assembly team worker is required to insert the fastener through the connecting portions of the bumper fascia and fender panel without being able to visibly orient the fastener. As such, it has been known to provide fastener housings which are inserted through the connecting portions of the bumper fascia and the fender panel with greater ease. However, these previously known fastener housings typically have a uniform or circular configuration which once inserted into the connecting portions rotates within the connecting portions causing increased difficulty in inserting and securing the fastener.

Further, the fastener housings often are required to be inserted into the connection components having a specific orientation. However, as the assembly team member is inserting the fastener housing from a blind position without visually identifying the orientation of the fastener housing, the previously known fastener housings result in an increase in misinsertions. The incorrect insertion of the fastener housing with an incorrect orientation requires the assembly team worker to stop production, remove the fastener housing, and reinsert the fastener housing within the bumper fascia and the fender panel.

Thus, there exists a need for an improved attachment assembly having a fastener housing in which a rigid character line can be provided and that also prevents the insertion of the fastener housing in an incorrect orientation into the connection portion.

SUMMARY OF THE INVENTION

The present invention provides an attachment assembly having a fastener housing which overcomes the above-mentioned disadvantages of the previously known attachment assemblies and fastener housings.

In brief, a fastener housing for securing a bumper fascia to a fender panel includes a shank portion, a skirt portion, and an arm portion. The shank portion includes a first end and an opposite second end and a throughbore extending from the first end to the second end. The shank portion has a widened cross sectional shape which avoids rotation upon insertion into the connection portion of the bumper fascia or fender panel. The skirt portion extends radially from the first end of the shank portion, and includes an outwardly extending collar at least partially surrounding the throughbore. The arm portion includes a proximate end connected to the skirt portion and a distal end having a protrusion extending generally normal from the arm portion.

The fastener housing is used in the attachment assembly to attach a fender panel to a bumper fascia. The fender panel includes a fender flange extending inwardly from an interior surface of the fender panel. The fender flange includes a widened aperture. The bumper fascia includes a bumper flange extending inwardly from an interior surface of the bumper fascia. The bumper flange includes a shaped aperture. The fastener housing is received within the widened aperture formed in the fender flange such that a bottom surface of the skirt portion abuts the fender flange.

The engagement of the widened aperture with the shank portion having the widened cross sectional shape prevents rotation of the fastener housing within the fender flange. The bumper flange is then brought into engagement with a top surface of the skirt portion such that the collar extends through the shaped aperture. A fastener extends through the collar within the shaped aperture and through the throughbore so as to secure the bumper fascia to the fender panel. The arm portion is positioned so that the protrusion extends beyond an edge of the fender flange to properly orient the fastener housing with respect to the fender flange.

BRIEF DESCRIPTION OF THE DRAWINGS

A better understanding of the present invention will be had upon reference to the following detailed description when read in conjunction with the accompanying drawings, wherein like reference characters refer to the like parts throughout the several views and in which.

DETAILED DESCRIPTION OF THE INVENTION

The present invention has utility as an attachment assembly for securing a bumper fascia to a fender panel which overcomes the above-mentioned disadvantages. By providing a fastener housing having a widened cross sectional shape that engages with a widened aperture formed in a fender flange, rotation of the fastener housing prior to the securement of the bumper to the fender panel is avoided. Further, an orientation arm extending from the fastener housing prevents the fastener housing from being completely inserted into the fender flange at an incorrect orientation, thereby avoiding delays in production.

Figure 1:
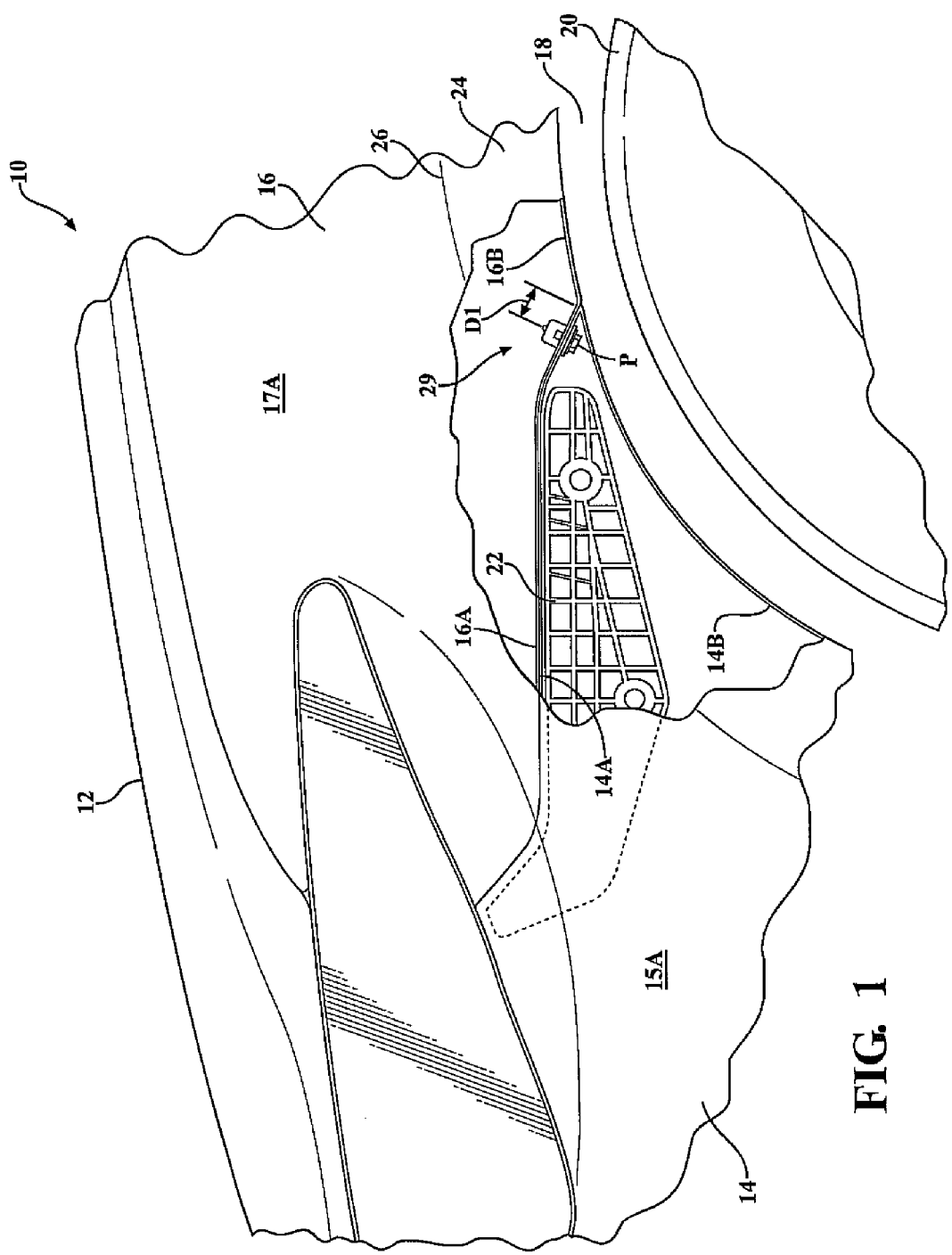
FIG. 1 is a partial side view of an automotive vehicle having the inventive attachment assembly.

With reference to FIG. 1, an automotive vehicle having the attachment assembly for connecting a first component to a second component is generally illustrated at 10. The automotive vehicle 10 includes a hood 12 that covers an upper portion of a front side in the vehicle longitudinal direction. A bumper fascia 14, having an exterior surface 15A, is positioned on the front side of the automotive vehicle 10 and extends across the vehicle width direction and a portion of the vehicle sides. A fender panel 16, having an exterior surface 17A, is positioned on either side of the automotive vehicle below the hood 12. It is appreciated, of course, that the automotive vehicle 10 includes a symmetric attachment assembly on an opposite side and a rear bumper fascia and rear fender panels; however, in an effort for clarity only, the illustrated side will be described.

The bumper fascia 14 includes an edge portion 14A that abuts an edge portion 16A of the fender panel 16. Each of the bumper fascia 14 and the fender panel 16 include an arcuate edge portion 14B and 16B, respectively. The edge portion 14A and the arcuate edge portion 14B of the bumper fascia 14 form an arcuate angle, and the edge portion 16A and the arcuate edge portion 16B of the fender panel 16 form a complementary obtuse angle. The arcuate edge portion 14B of the bumper fascia 14 and the arcuate edge portion 16B of the fender panel 16 define a wheel well 18 for receiving a wheel 20.

The edge portion 14A of the bumper fascia 14 is connected to the edge portion 16A of the fender panel 16 by a retainer 22. The bumper fascia 14 is secured to the vehicle body by retainer 22 by any means known to those of ordinary skill in the art for connecting one body panel to another illustratively including threaded fasteners, adhesives, rivets, or welding. A flared portion 24 is formed adjacent the arcuate edge portions 14B and 16B of the bumper fascia 14 and the fender panel 16, respectively, along the wheel well 18. The flared portion 24 is defined from the remainder of the fender panel 16 and the bumper fascia 14 by a character line 26. The character line 26 is a rigid character line in which the flared portion 24 extends from the fender panel 16 and the bumper fascia 14 directly without a soft or curved portion.

In order to provide the proper placement of the edge portion 14A and edge portion 16A of the bumper fascia 14 and the fender panel 16, respectively, an attachment assembly 29 is provided to connect the fender panel 16 to the bumper fascia 14. The attachment assembly 29 includes an attachment point P which is provided a distance D1 from the arcuate edge portions 14B and 16B of the bumper fascia 14 and the fender panel 16. The distance D1 is less than 30 millimeters so as to provide the proper rigidity to both the fender panel 16 and the bumper fascia 14.

Figure 2:
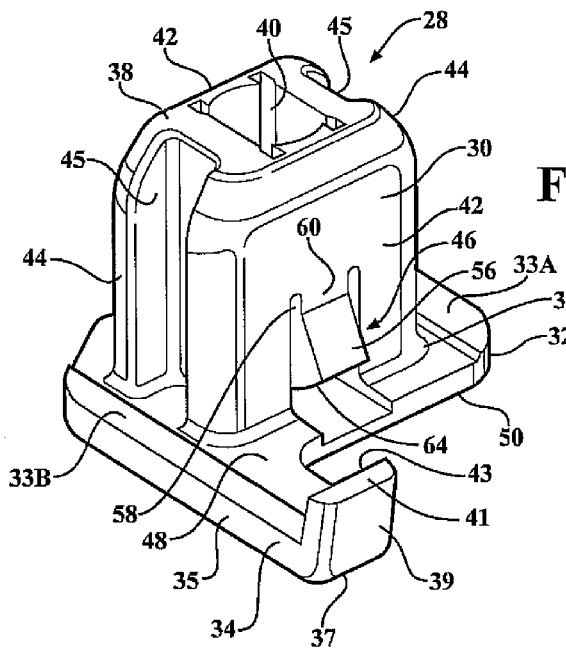
FIG. 2 is a perspective view of the inventive fastener housing.
Figure 3A:
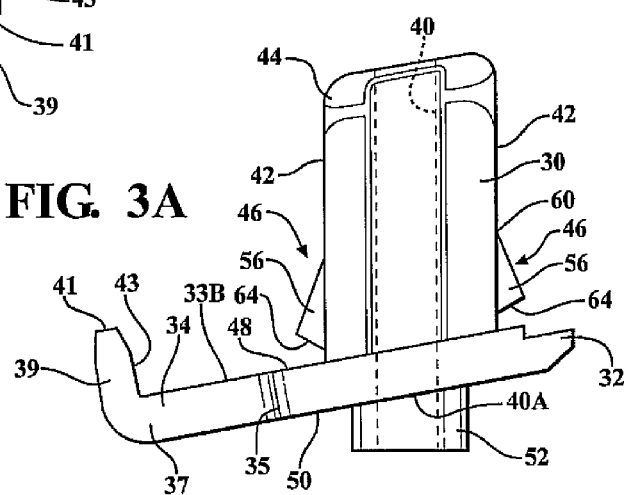
FIG. 3A is a side view of the inventive fastener housing.
Figure 3B:
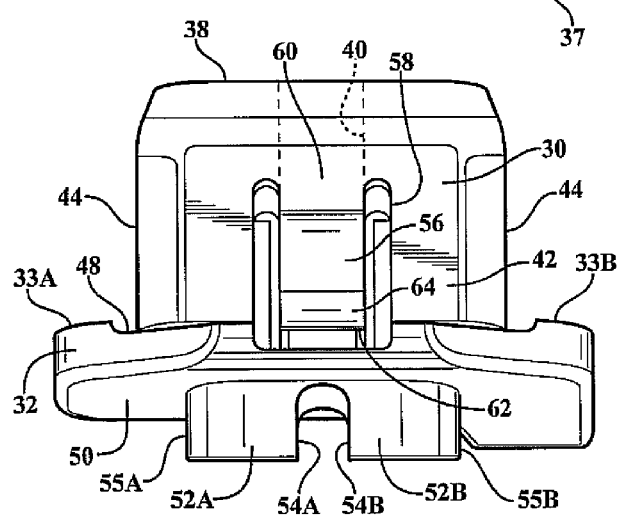
FIG. 3B is a front view of the inventive fastener housing.

With reference to FIGS. 2, 3A and 3B, the attachment assembly 29 will be described in greater detail. The attachment assembly 29 includes a fastener housing 28 having a shank portion 30, a skirt portion 32, and an arm portion 34. The shank portion 30 has a first end 36 and a second end 38. A throughbore 40 extends entirely through the fastener housing 28 from the first end 36 to the second end 38 of the shank portion 30.

The shank portion 30 is formed of a first pair of opposing side walls 42 and a second pair of opposing side walls 44. The second pair of opposing side walls 44 are provided with a recess 45 to reduce weight and maintain product integrity by eliminating plastic sink. A snap tab 46 is formed integrally with each one of the first pair of opposing side walls 42. In order to provide the shank portion 30 with a widened cross sectional shape, the width of the first pair of walls 42 is larger than the second pair of walls 44.

The skirt portion 32 extends radially from the first end 36 of the shank portion 30 and has a generally planar shape. The skirt portion 32 is disposed at an angled orientation relative to the throughbore 40 as best seen in FIG. 3A. The skirt portion 32 includes a bottom surface 48 and an opposite upper surface 50. A collar 52 extends outwardly from the upper surface 50 of the skirt portion 32. The collar 52 at least partially surrounds the throughbore 40 opening from the skirt portion 32. The collar 52 is optionally formed of two portions 52A and 52B disposed on either side of an opening 40A of the throughbore 40 formed in the skirt portion 32. An interior surface 54A and 54B of the collar portions 52A and 52B have a generally arcuate shape which corresponds to the arcuate circular shape of the opening 40A of the throughbore 44. The collar portions 52A and 52B each include exterior surfaces 55A and 55B, respectively, having a defined shape. In the illustrated embodiment, the exterior surfaces 55A and 55B define an elongated oval shape.

The fastener housing 28 includes an arm portion 34 having a proximate end 35 integrally formed with the skirt portion 32 and a distal end 37 having an end portion or protrusion 39 extending generally normal from the arm portion 34. The arm portion 34 extends generally coplanar with the skirt portion 32 and is consequently disposed at an angled orientation with respect to the throughbore 40. The skirt portion 32 includes ridges 33A and 33B extending along the sides of the skirt portion 32 facing the second pair of side walls 44. The ridge 33B extends along the arm portion 34 to the inner surface 43 of the protrusion 39.

It is appreciated, of course, that the fastener housing 28 having the shank portion 30, the skirt portion 32 and the arm portion 34 are integrally formed as a one piece monolithic structure including all features thereof. The integrally formed fastener housing 28 is formed as a one piece plastic structure by a molding processing such as injection molding.

The snap tab 46 includes a tab portion 56 defined by a generally U-shaped cutout 58. The tab portion 56 includes a proximate end 60 which is integrally formed with the first pair of opposing side walls 42 and a free distal end 62. The distal end 62, as best seen in FIGS. 3B and 6B, is spaced apart from the bottom surface 48 of the skirt portion 32 by a portion of the U-shaped cutout 58. The side portions of the U-shaped cutout 58 extend along the sides of the tab portion 56 allowing the tab portion to flex relative to the remaining portion of the first pair of side walls 42. The tab portion 56 has a generally ramped shape increasing in thickness extending from the proximate end 60 towards an undercut 64 positioned between the proximate end 60 and the distal end 62. As best seen in FIG. 6B, the undercut 64 decreases in thickness extending towards the distal end 62 and includes a planar section 63 adjacent the distal end 62. As discussed in greater detail below, the snap tab 46 optionally includes a stepped portion 65 formed between the apex of the tab portion 56 and the undercut 64.

Figures 4A, 4B:
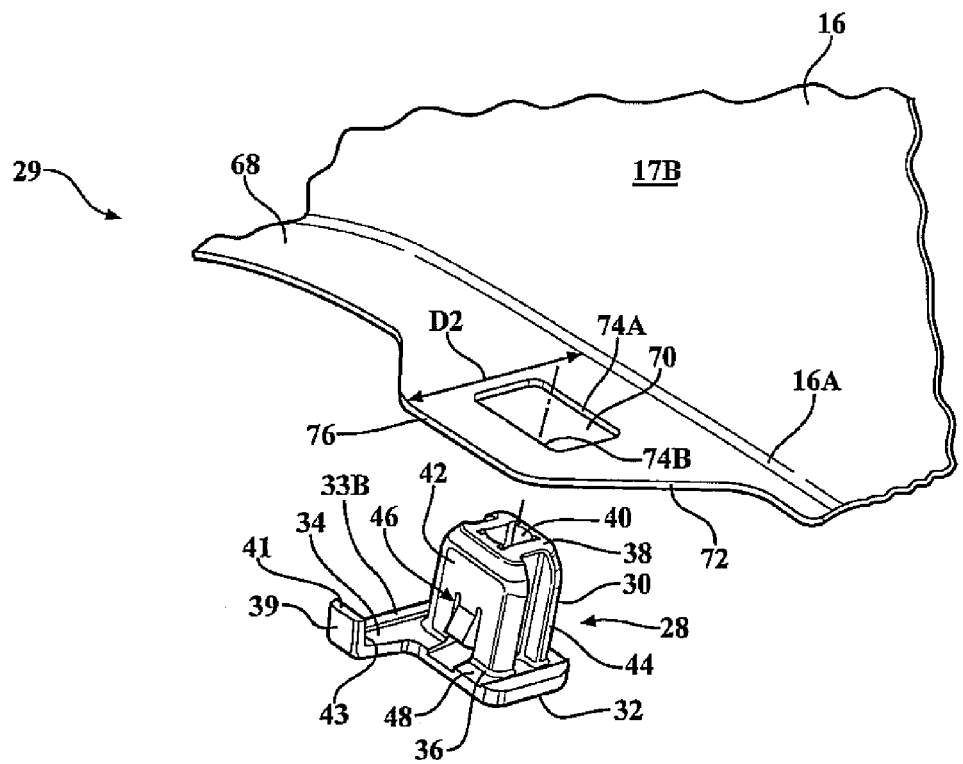
FIG. 4A illustrates the connection component of the fender panel and the fastener housing.
FIG. 4B illustrates the fastener housing received within the fender panel in a proper orientation.

With reference to FIGS. 4A and 4B, the engagement of the fastener housing 28 with the fender panel 16 will now be discussed. The fender panel 16 includes an interior surface 17B which is opposite the exterior surface 17A. A fender flange 68 extends from the interior surface 17B of the fender panel 16 in an inwardly direction in the vehicle width direction. Specifically, the fender flange 68 extends inwardly in the vehicle width direction, from the edge portion 16A of the fender panel 16. The fender flange 68 has a length D2 of 23 millimeters. The length of the fender flange 68 allows for the flared portion 24 to be formed with a rigid character line 26.

The fender flange 68 includes a widened aperture 70 for receiving the shank portion 30 of the fastener housing 28. The widened aperture 70 has a shape corresponding to the cross sectional shape of the shank portion 30. In the illustrated embodiment the widened shape of the widened aperture 70 and the cross sectional shape of the shank portion 30 is an elongated rectangular shape. The corresponding widened shapes of the widened aperture 70 and the cross section of the shank portion 30 allow for the shank portion 30 to be inserted into the widened aperture 70, as best seen in FIG. 4B, to prevent the rotation of the fastener housing 28 within the widened aperture 70. It is to be understood that although the illustrated embodiment discloses an elongated rectangular shape, other shapes including ovals or any other oblong or geometric shape which would prevent rotation including regular or irregular polygons illustratively including trapezoidal, parallelogram, rhombus, octagon, or hexagonal shapes.

Upon insertion of the shank portion 30 of the fastener housing 28 into the widened aperture 70, the second end 38 is inserted first and the length of the shank portion 30 until the bottom surface 48 of the skirt portion 32 abuts a contact surface 72 of the fender flange 68. Specifically, the ridges 33A and 33B extending outwardly from the bottom surface 48 of the skirt portion 32 abut the contact surface 72 of the fender flange 68.

During insertion of the shank portion 30 into the widened aperture 70, the tab portion 56 of the snap tab 46 on each of the first pair of opposing walls 42 is depressed inwardly due to the ramped shape of the tab portion 56. The tab portion 56 flexes with the free distal end 62 within the U-shaped cutout 58 until the apex passes through the widened aperture 70 and engages with sides 74A and 74B of the widened aperture 70. The position of the snap tabs 46 on each of the first pair of opposing walls 42 secures the fastener housing 28 within the widened aperture 70 allowing an assembly team member to secure the fastener housing 28 within the fender panel 16 prior to positioning the bumper fascia 14. As seen in FIG. 6B, the side 74B of the widened aperture is placed in an interference fit between with the undercut 64. In the engaged position the stepped portion 65 of the snap tabs 46 and prevents movement of the sides 74A and 74B from disengaging from the snap tabs 46.

When the fastener housing 28 is installed within the widened aperture 70 at a correct orientation, the protrusion 39 of the arm portion 34 extends beyond a distal edge 76 of the fender flange 68. The arm portion 34 is dimensioned to have a predetermined length such that the distance between the side wall 42 facing the arm portion 34 and an inner surface 43 of the protrusion 39 is greater than the distance between side 74B of the widened aperture 70 and the edge 76 of the fender flange 68. Therefore, the arm portion 34 does not impede installation of the fastener housing 28 in a proper orientation, with the fastener housing 28 positioned such that the arm portion 34 extends towards the edge 76 of the fender flange 68. In such a proper orientation, the protrusion 39 extends beyond the edge 76 of the fender flange 68 when installed. If the fastener housing 28 is inserted into the widened aperture 70 in an improper orientation, the arm portion 34 prevents the engagement of the fastener housing 28, specifically the snap tabs 46, with the widened aperture 70. Due to the angled orientation of the arm portion 34 and the skirt portion 32 with respect to the throughbore 40, a top portion 41 of the protrusion 39 would abut the contact surface 72 of the fender flange 68 preventing the snap tabs 46 from engaging with the sides 74A and 74B of the widened aperture 70. The lack of engagement alerts an assembly team member of the improper orientation of the fastener housing 28.

Figure 5:
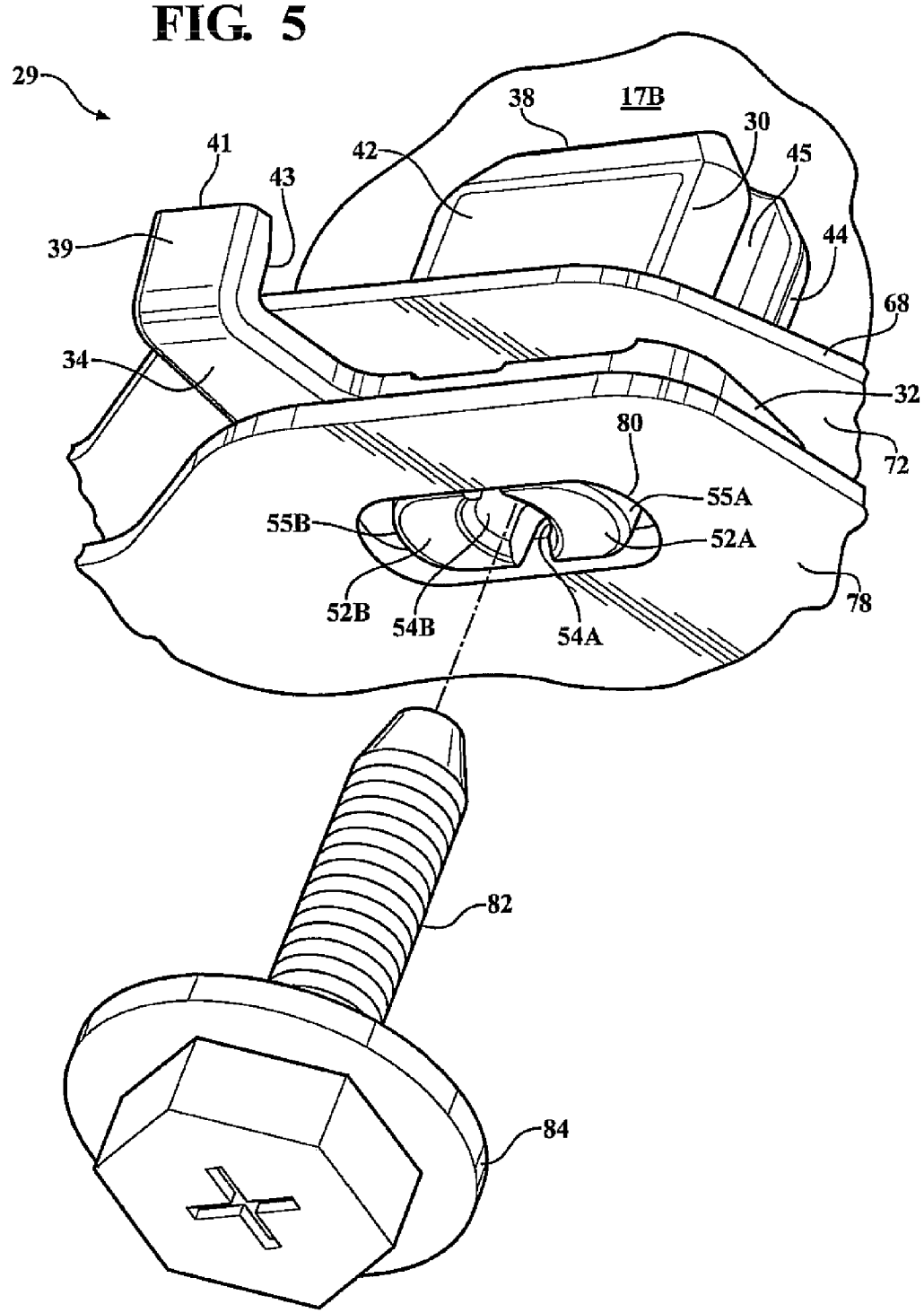
FIG. 5 is a perspective view illustrating the fastener housing received within the fender panel and the collar portion received within the bumper fascia.
Figure 6A:
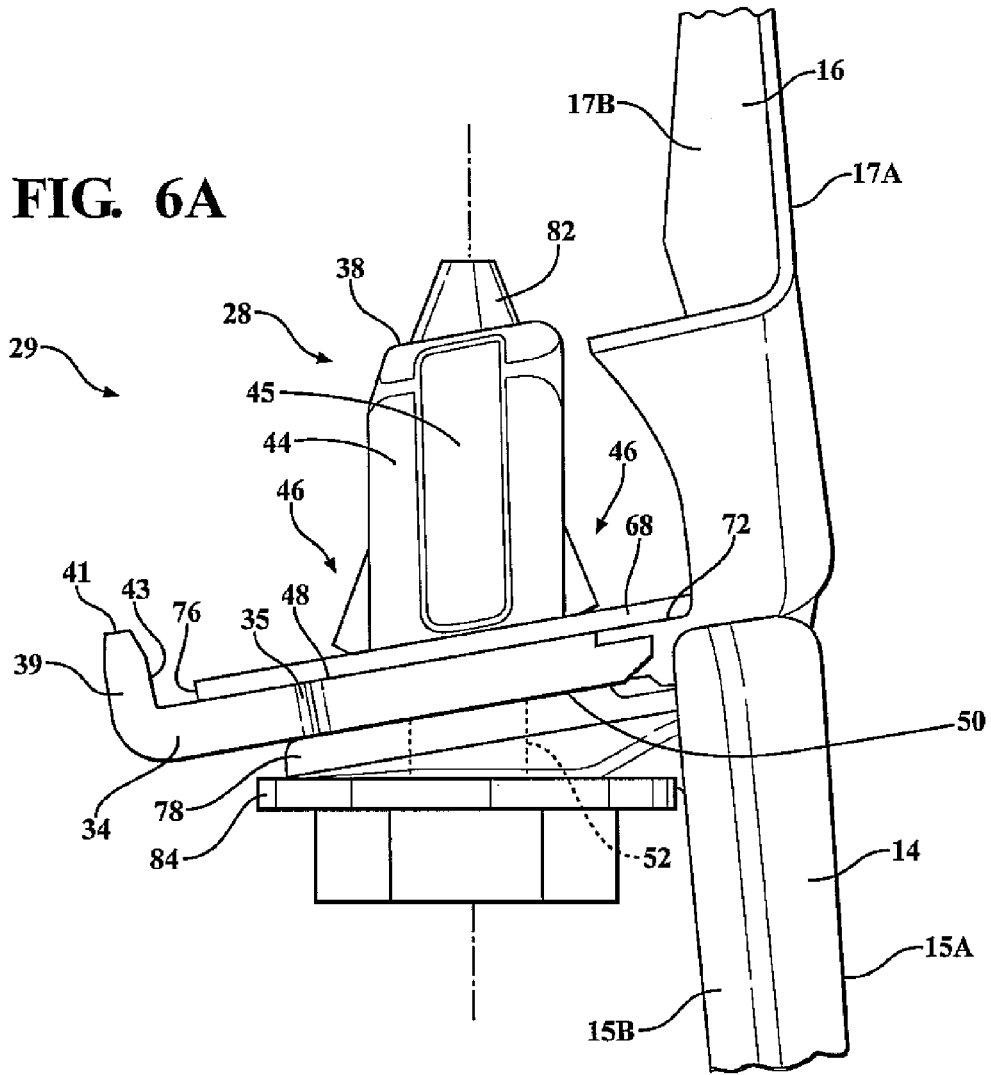
FIG. 6A is a side elevational view of the fastener housing connected to the fender panel and the bumper fascia to secure the fender panel to the bumper fascia.
Figure 6B:
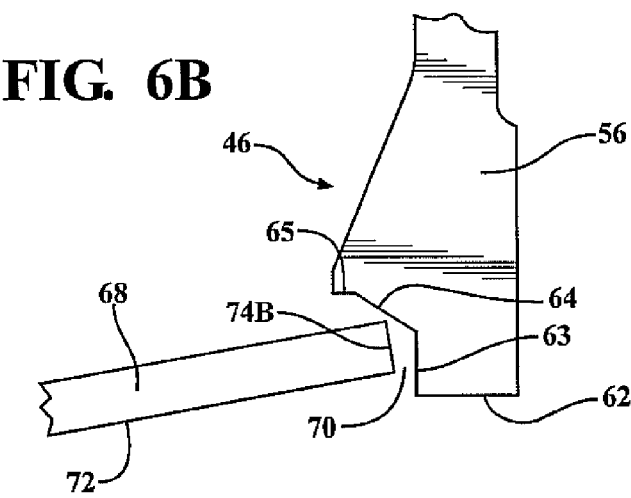
FIG. 6B is an enlarged view illustrating the engagement of the snap tab with the fender flange.

Once the fastener housing 28 has been properly inserted into the widened aperture 70 of the fender flange 68 in a proper orientation including the securement of the fastener housing 28 to the fender flange 68 due to the engagement of the snap tabs 46, the bumper fascia 14 is brought into engagement with the fastener housing 28 as best seen in FIGS. 5 and 6. Similar to the fender 16, the bumper fascia 14 includes a bumper flange 78 extending from the interior surface 11 opposite the exterior surface 13. Specifically, the bumper flange 78 extends inwardly in the vehicle width direction from the edge portion 14A of the bumper fascia. The bumper flange 78 includes a shaped aperture 80 having a corresponding shape to the shape formed by the exterior surfaces 55A and 55B of the collar portions 52A and 52B. The bumper flange 78 is brought into engagement such that the upper surface 50 of the skirt portion 32 abuts the bumper flange 78 thereby positioning the skirt portion 32 between the bumper flange 78 and the fender flange 68. The collar portions 52A and 52B extend through the shaped aperture 80 of the bumper flange 78 and have a height similar to the thickness of the bumper flange 78 such that upon installment of the fastener 82 with washer 84, the washer 84 abuts the top surface of the collar portions 52A and 52B and the fastener 82 is spaced apart from contacting the edge 86 of the shaped aperture 80. The fastener 82 is typically a threaded fastener such that installment of the fastener 82 within the throughbore 40 secures the bumper flange 78 to the fender flange 68 due to the engagement of the fastener 82 within the fastener housing 28.

From the foregoing, it can be seen that the present invention provides an attachment assembly having a fastener housing which prevents rotation upon installment into the fender panel and prevents the improper installation of the fastener housing. Having described the invention, however, many modifications thereto will become apparent to those skilled in the art to which it pertains without deviation from the spirit of the invention as defined by the scope of the appended claims.

It is claimed:

1. A fastener housing for receiving a fastener to secure a fender panel to a bumper, the fender panel having a fender flange having an aperture and a distal edge spaced apart from said aperture, said bumper having a bumper flange having a shaped aperture, said fastener housing comprising:

a shank portion having a first end and an opposite second end, a throughbore extends from said first end to said second end in a first direction, said shank portion having a widened cross sectional shape;

a skirt portion extending radially from said first end of said shank portion, said skirt portion having a first surface and an opposite second surface, said first surface and said second surface extending parallel;

a collar extending outwardly from said first surface of said skirt portion, said collar at least partially surrounds said throughbore, said collar extending coaxial with said throughbore of said shank portion, and said collar extending obliquely to said first surface and said second surface; and an arm portion having a first portion and a second portion, said first portion of said arm portion extending generally coplanar with said skirt portion along a second direction, said first portion of said arm portion having a proximate end and a distal end, said proximate end connected to said skirt portion and said second portion of said arm portion extending generally normal from said distal end of said first portion of said arm portion, said skirt portion and said first portion of said arm portion are disposed at an angled orientation relative to said throughbore such that said first direction and said second direction form an oblique angle;

said second portion of said arm portion extends beyond the distal edge of the fender flange to properly orient said fastener housing with respect to said fender panel upon insertion of said shank portion within the aperture of the fender flange.

2. The fastener housing of claim 1, wherein said fastener housing is capable of being received within the aperture of the fender flange of the fender panel, and wherein when said shank portion is received within said aperture and said second portion extends beyond the distal edge of the fender panel.

3. The fastener housing of claim 2, wherein said second portion of said arm portion extends in a third direction, and wherein said third direction extends generally normal to said second direction and said third direction extends generally nonparallel to said first direction.

4. The fastener housing of claim 3,
wherein said collar abuts a flange portion of the fastener to space the flange portion of the fastener a predetermined distance from said first surface of said skirt portion.

5. The fastener housing of claim 4, wherein said shank portion includes a pair of opposing side walls, and wherein said shank portion includes a snap tab formed integrally with at least one of said pair of opposing side walls.

6. The fastener housing of claim 5, wherein said snap tab includes a tab portion having a proximate end and a distal end, said proximate end of said tab portion connected to said at least one of said pair of opposing side walls, said distal end of said tab portion having a ramped surface formed thereon, and wherein a generally U-shaped cutout extends along a pair of sides of said tab portion and between said distal end of said tab portion and said second surface of said skirt portion.

7. An attachment assembly comprising:
a first vehicle body component having a first inwardly extending flange having an aperture and a distal edge spaced apart from said aperture;
a second vehicle body component having a second inwardly extending flange having a shaped aperture formed therein; and
a fastener housing that receives a fastener to secure said first body component to said second body component, said fastener housing having a shank portion, a skirt portion, a collar, and an arm portion;
said shank portion having a first end and an opposite second end, a throughbore extending from said first end to said second end in a first direction, said shank portion having a widened cross sectional shape, said first flange of said first vehicle body component extending at an angled orientation with said shank portion such that said first direction and said first flange form an oblique angle;

said skirt portion extending radially from said first end of said shank portion, said skirt portion having a first surface and an opposite second surface, said first surface and said second surface extending parallel; said collar extending outwardly from said first surface of said skirt portion, said collar at least partially surrounds said throughbore, said collar extending coaxial with said throughbore of said shank portion, and said collar extending obliquely to said first surface and said second surface; and said arm portion having a first portion and a second portion, said first portion of said arm portion extending generally coplanar with said skirt portion along a second direction, said first portion of said arm portion having a proximate end and a distal end, said proximate end connected to said skirt portion and said second portion of said arm portion extending generally normal from said distal end of said first portion of said arm portion;

said first surface and said second surface of said skirt portion and said first portion of said arm portion are disposed at an angled orientation relative to said throughbore such that said first direction and said second direction form an oblique angle; said shank portion received within said aperture of said first flange of said first body component and said skirt portion positioned between said first flange of said first body component and said second flange of said second body component, said second portion of said arm portion extends beyond said distal edge of said first flange to properly orient said fastener housing with respect to said first body component.

8. The attachment assembly of claim 7, wherein said second portion of said arm portion extends in a third direction, and wherein said third direction extends generally normal to said second direction and said third direction extends generally nonparallel to said first direction.

9. The attachment assembly of claim 8,
wherein said collar abuts a flange portion of the fastener to space the flange portion of the fastener a predetermined distance from said first surface of said skirt portion.

10. The attachment assembly of claim 9, wherein said shank portion includes a pair of opposing side walls, and wherein said shank portion includes a snap tab formed integrally with at least one of said pair of opposing side walls.

11. The attachment assembly of claim 10, wherein said snap tab includes a tab portion having a proximate end and a distal end, said proximate end of said tab portion connected to said at least one of said pair of opposing side walls, said distal end of said tab portion having a ramped surface formed thereon, and wherein a generally U-shaped cutout extends along a pair of sides of said tab portion and between said distal end of said tab portion and said second surface of said skirt portion.

12. The attachment assembly of claim 7, wherein said first component is a fender of an automotive vehicle.

13. The attachment assembly of claim 12, wherein said second component is a bumper fascia of said automotive vehicle.

* * * * *